United States Patent [19]

De Vito

[11] Patent Number: 4,538,850
[45] Date of Patent: Sep. 3, 1985

[54] HOISTING AND SHACKLE SYSTEM

[76] Inventor: Nicholas A. De Vito, Clifton, N.J.
[21] Appl. No.: 473,102
[22] Filed: Mar. 7, 1983
[51] Int. Cl.³ .......................... B66C 1/34; B66C 1/66
[52] U.S. Cl. .................................. 294/89; 294/82.19; 24/232 R; 52/125.2
[58] Field of Search ..................... 294/83 R, 83 A, 84, 294/85, 89, 106, 118; 24/230.5 R, 230.5 AD, 232 R, 238, 241 P; 52/125.2-125.5

[56] References Cited

U.S. PATENT DOCUMENTS

| | | | |
|---|---|---|---|
| 608,123 | 7/1898 | Humble | 24/232 X |
| 761,809 | 6/1904 | Anderson | 294/84 |
| 943,220 | 12/1909 | Dufour | 294/83 R |
| 2,100,497 | 11/1937 | White | 294/118 |
| 2,404,775 | 7/1946 | Ehmann | 294/89 X |
| 3,883,170 | 5/1975 | Fricker et al. | 294/89 X |
| 4,367,892 | 1/1983 | Holt | 294/89 |

FOREIGN PATENT DOCUMENTS

| | | | |
|---|---|---|---|
| 1756606 | 4/1970 | Fed. Rep. of Germany | 294/89 |
| 2417680 | 10/1975 | Fed. Rep. of Germany | 294/89 |
| 2514301 | 10/1976 | Fed. Rep. of Germany | 294/89 |

Primary Examiner—Johnny D. Cherry
Attorney, Agent, or Firm—Melvin K. Silverman

[57] ABSTRACT

A scissors-like engagement system includes pivotally secured first and second mating elements mutually including, at the ends of the mating elements, surfaces for complementally gripping and holding a projecting segment of an anchor element, in which the external surfaces of the ends of the mating elements define a parabolic surface nesting within a semi-hemispherical recess surrounding the anchor element. The complemental mating surfaces constitute male and female elements extending from, and centrally located within, the mating surfaces. The gripping surfaces are normally parallel to each other when the scissors-like engagement system is in a closed position about the anchor element. The male element of the complemental mating surfaces is an elongate, curvilinear, solid cylindrical member, the line of curvature of which lies equidistant from the surface of the semi-hemispherical recess within which the parabolic surface of the mating elements nest. The engagement system provides a positive interlock between the curvilinear male element and its complementary female element to, in combination with the anchor element gripping surfaces, limit movement of the anchor element relative to the engagement system, both within the linear axis of the male and female elements and in any transverse plane.

5 Claims, 22 Drawing Figures

HOISTING AND SHACKLE SYSTEM

BACKGROUND OF THE INVENTION

The invention relates to hoisting and lifting apparatus and, in particular, to hoisting shackles which will particularly cooperate with special anchoring elements arranged in the load itself. Such hoisting operations are used in connection with prefabricated building elements in the construction industry involving, typically, precast, pre-stressed, post-tensioned and/or reinforced concrete components.

Modern construction technology not only requires the transportation, hoisting and positioning of particularly heavy building components but, as well, requires that such material handling operations be efficient, safe and reduce the probability of damage to the components themselves.

One proposed solution to the above problem is that of incorporating non-recoverable anchoring elements within the building components themselves during fabrication and, thereafter, to attach these components directly to the crane or shackle means. However, one difficulty with the use of such anchoring elements is that such anchoring elements generally form otherwise permanent protrusions from the building component and, thereby, require their removal by cutting, using a blowtorch, or the like.

In order to avoid the above problem, it has been suggested that the anchoring elements be recessed within the pre-fabricated building component such that they would not project over the surface of the component and, therefore, could be left in place after emplacement of the component has occurred. Further, where necessary, the recesses surrounding the anchoring elements could easily be filled in order to thereby remove any trace of the existence of the anchoring elements.

As can be appreciated, it is necessary to accurately position the anchoring elements during the concrete pouring of the building component in order to attain a desired engagement with such anchors by whatever hoisting or lifting means is to be utilized. Thus, it is known in the art to form recesses within building components utilizing an addition to the basic component mold so that a recess will be formed about the anchoring element during the molding process. In this technique, once the concrete and the mold is set, the so-called recess element can be removed from the prefabricated component.

While in many cases the use of recessed anchoring elements offers a certain economy of cost, it has also been the experience of the industry that such recesses may themselves represent a structural problem in that they are either too small for convenient access by conventional hooks or, in some situations, are so large that they may cause structural stress problems by reducing the overall bending resistance of the building component itself.

Several patents in the prior art address the above problems; these patents include: U.S. Pat. Nos. 3,883,170 and 4,173,856 to Fricker; U.S. Pat. Nos. 4,173,367 and 4,296,909 to Haeussler; and U.S. Pat. No. 4,262,951 to Hoyer. Pertinent foreign art includes West German Pat. No. 1,756,603 and West German Published Application No. 27-08-788.

The most pertinent areas of classification are believed to be U.S. Class 294, Sub-Classes 83 and 89.

The invention may be viewed as an effort to provide a more effective shackle, hoisting and positioning means for use in, and in association with, recessed anchoring elements.

SUMMARY OF THE INVENTION

The present invention relates to a shackle, hoisting and positioning system for the moving of building components, comprising: Firstly, an elongated anchor element positioned within a body of a building component, said anchor element itself comprising both a first length portion serving as a means for retaining said anchor element within the body of the building component, and a second length portion constituting a segment of said anchor element which is exposed from the body of said building component, said second length portion having an established configuration, said configuration including at least one opening transverse to the narrowest cross-section of said second length portion of the anchor element; secondly, a void former for positioning said anchor element within said building component during the casting thereof, said void former comprising a mold-insert in substantially the form of a segment of a semi-hemisphere wherein, upon removal of said void former from the building component, said second length portion is desirably positioned within a thereby formed semi-hemispherical recess within the surface of the building component; and, thirdly, a scissors-like engagement means comprising first and second mating elements mutually comprising, at the ends thereof, surfaces for complementally gripping and holding said established configuration of said second length portion of the anchor and in which the external surfaces of said ends of said mating elements define a parabolic surface that nests within said semi-hemispherical recess of the building component, such that no other area of the building component other than the recess can be touched by the engagement means of any lifting means associated therewith, whereby said anchor element and thus the entire building component can be precisely and securely engaged and, thereafter, re-positioned in a safe, efficient and spall-free manner.

It is a primary object of the present invention to overcome shortcomings in the industry in order to provide a means which will safely, efficiently and accurately cooperate with special, recessed anchoring elements within a building component which, typically, is formed of concrete.

A further object is to provide in engagement means that will particularly mate with both an anchor element and a specially formed recess within a concrete body in order to obtain the primary object recited above and to provide for a solid and fixed attachment to the load while allowing for swivel of the attachment apparatus in any direction that the load may be hoisted.

A yet further object of the invention is to provide a shackle and hoisting system that will accomplish the movement of a building component without an increased probability of damage to the component per se.

The above and other objects and advantages of the present invention will become apparent from the hereinafter set forth specification, claims and drawings.

DETAILED DESCRIPTION OF THE INVENTION

Figure 1:
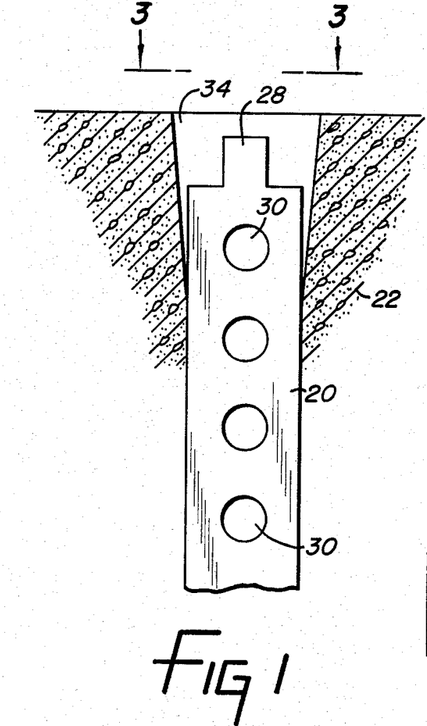
FIG. 1 is a longitudinal front schematic view of an anchor element embodied within a concrete building component.
Figure 2:
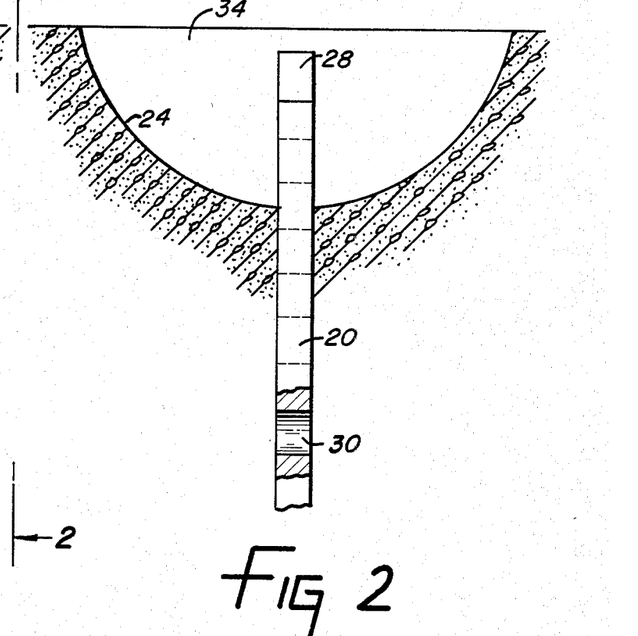
FIG. 2 is a side cross-sectional view of the anchor of FIG. 1.
Figure 3:
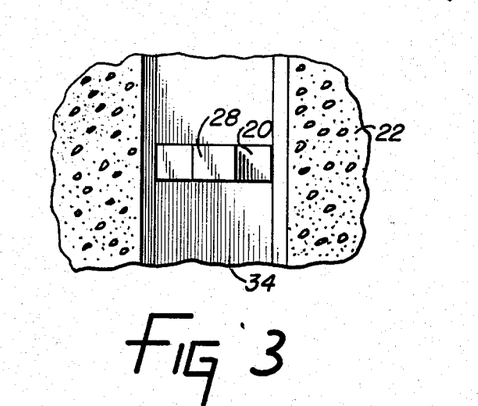
FIG. 3 is a top plan view of the anchor shown in FIG. 1.

There is shown in FIGS. 1, 2 and 3, front, side and top views respectively of an insert or anchor element 20, intended for placement across a longitudinal line of a pre-cast or reinforced concrete body. The use of such inserts or anchors has become commonplace in order to facilitate the lifting, movement, and desired positioning of pre-formed, reinforced concrete building components. The use of such inserts or anchor elements, which are permanently embedded within the pre-formed concrete building component, has become a state of the art feature in the field of concrete components, for purposes of movement and positioning of such components.

The present inventive lifting system involves the usage of three distinct mechanical elements which, as hereinafter set forth, are employed in order to accomplish a more efficient, effective and safer movement of the concrete bodies. As above noted, the present lifting requires use of a particular insert or anchor element which will be embedded to a depth that will avoid the possibility of it being pulled out of the concrete component. A first embodiment of the anchor 20 is shown in FIGS. 1, 2 and 3. The anchor 20 is embedded within a concrete body 22. The anchor 20 emerges from the concrete body 22 along a hemispherical surface 24, the formation of which will be described below.

After the anchor element exits from the concrete body 22, there is a tongue element 28, which is intended for complementary engagement with a lifting scissor which will be described below. With further reference to FIGS. 1 and 2, it is to be appreciated that a plurality of holes 30 reflect but one design option, among many, and in themselves are not germane to the instant invention.

Figure 4:
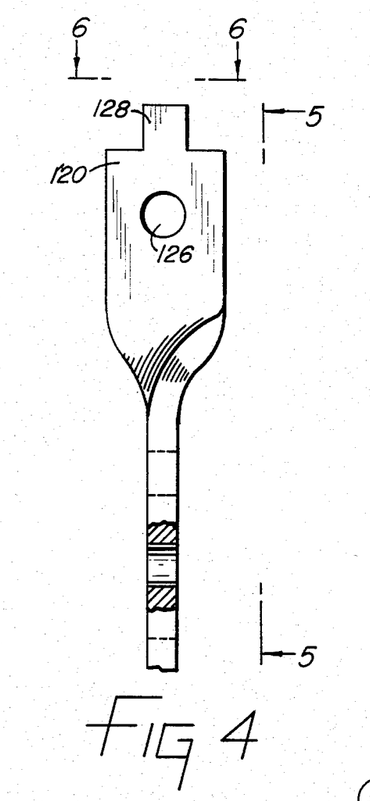
FIGS. 4, 5 and 6 are front, side and top views of a second embodiment of the anchor element of FIGS. 1 to 3.
Figure 5:
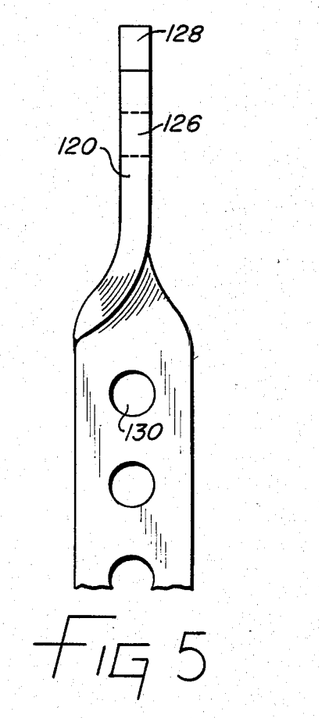
Figure 6:
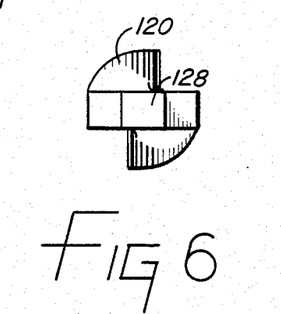

A second embodiment of the anchor element is shown in FIGS. 4 to 6. In this embodiment, an aperture 126 and tongue 128 are displaced 90 degrees with reference to the principal plane of the anchor 120 within which openings 130 are provided. In all other respects, the embodiment of FIGS. 4 and 5 displays the same structure as does the embodiment of the anchor element and is provided with a circular aperture 126 and a rectangular tongue 128, each adapted for engagement with a scissors means to be described hereinafter.

Figure 7:
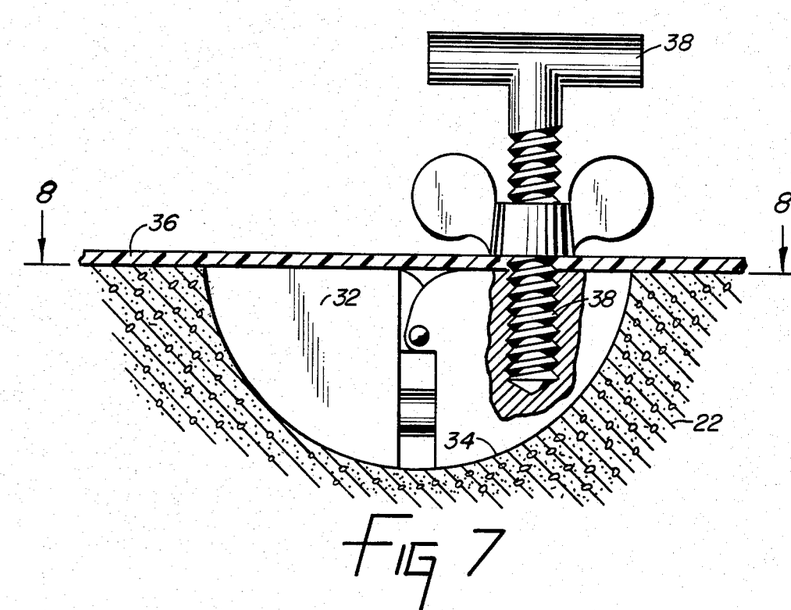
FIG. 7 is a side schematic representation of a void former shown in conjunction with a molding surface.
Figure 8:
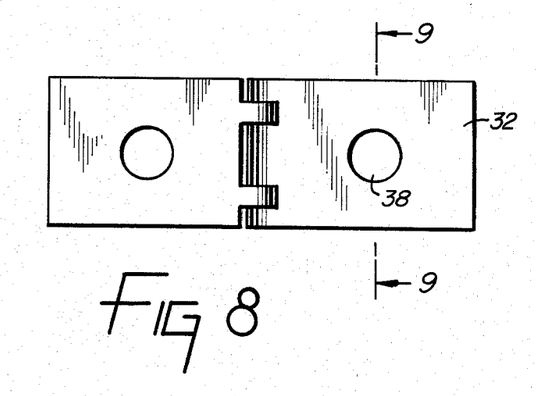
FIG. 8 is a top view of the void former of FIG. 7.
Figure 9:
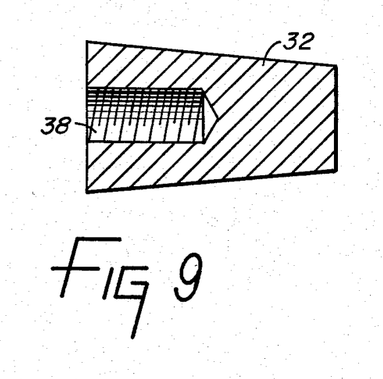
FIG. 9 is a side cross-sectional view of the void former, the cross-section taken through a holding bolt.
Figure 10:
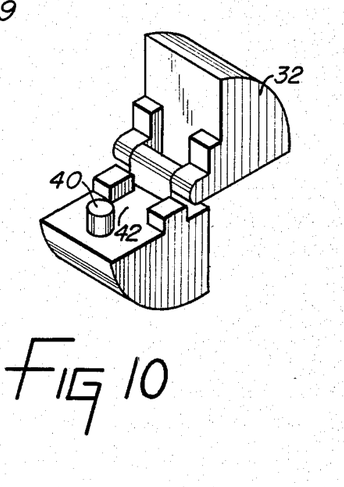
FIG. 10 is a perspective view of an open void former prior to connection to the surface of the mold of the concrete construction element.

The second mechanical element employed in the present inventive method is a void former 32 (see FIG. 7), the purpose of which is to form a segment of a semi-hemispherical void 34 (see FIG. 1) within the surface of the concrete body and, concurrently, to facilitate the proper positioning of the anchor 20 and its protruding elements within said semi-hemispherical void 34.

In order to understand the role of the void former 32 in the instant method, it is necessary to appreciate that almost all reinforced or pre-formed concrete bodies are formed within a mold 36 which generally consists of a plurality of planar plastic, steel or wood elements which, in combination, define the envelope of the pre-formed concrete body. Where it is desired to, in any manner, vary the planar surface of the mold in order to form a concrete body having other than one defined by planer surfaces, it is necessary to affix one or more elements to the interior of the mold to thereby modify the configuration of the concrete body to be formed. Additionally, where inserts or anchors are to be inserted into the concrete body, it is common to use adjunctive elements to the body mold in order to assure that the anchor elements will set within the concrete in the desired position and, as well, to ensure that any projecting segments of such anchor elements will protrude at the location and at the angle desired in order to facilitate a proper inter-action between such projecting segment of the anchor and an engagement means that may be utilized by the concrete body assembly, hoisting or transporting personnel.

In the method of the present invention, a single void forming element 32 is affixed to the wall 36 of the concrete mold utilizing a connecting and securing means 38. The void forming means 32 serves to both secure the anchor 20 in a proper disposition within the concrete mass 22 but, as well, serves to form the semi-hemispherical void 34 which, as will hereinafter be seen, is necessary in order to both protect the tongue 28 of the anchor means from damage during the assembly process and, also to provide the clearance necessary for an engagement means 50 (described below) to freely engage the tongue 28 and aperture 30 of the anchor means, thereby facilitating an efficient and spall-free movement of the concrete body.

A first embodiment of the two-part void former is shown in FIGS. 7 through 10. As may be clearly seen in FIG. 10, the interior dimensions and, in particular, male member 40 and cavity 42 are jointly complementary to the circular aperture 30 and rectangular tongue 28 respectively of the anchor element 20. Thereby, a firm engagement of the ends of the anchor 20 is accomplished through the use of the void former 32 during the molding and setting of the concrete body. Various embodiments of the void former 32 may be used in order to accomplish the same purpose. For example, in the embodiment of FIG. 7, screw 38, disposed transversely to the mold wall 36 may be used in order to mutually secure the void former 32 and the mold wall 36.

Figure 11:
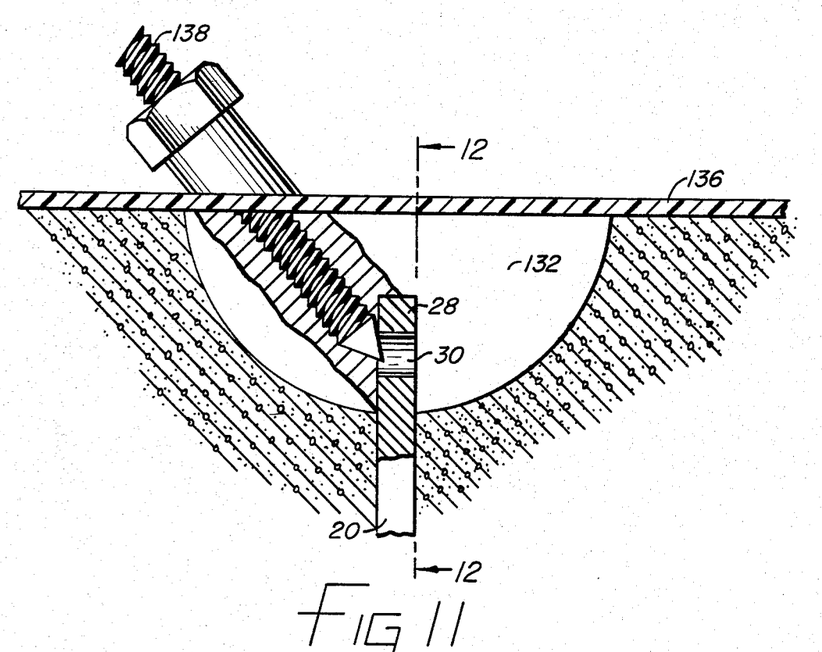
FIG. 11 is a side schematic view, conceptually the same as the illustration of FIG. 7, however, showing the securement of a non-hinged void former to the wall of the mold in a second manner.
Figure 12:
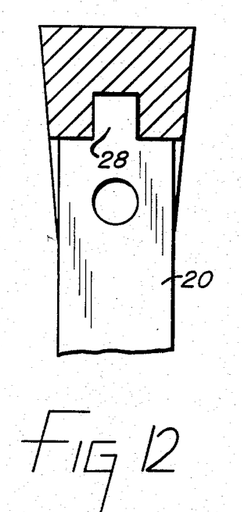
FIG. 12 is a cross-sectional view of the anchor and non-hinged void former, taken along line 12—12 of FIG. 11.
Figure 13:
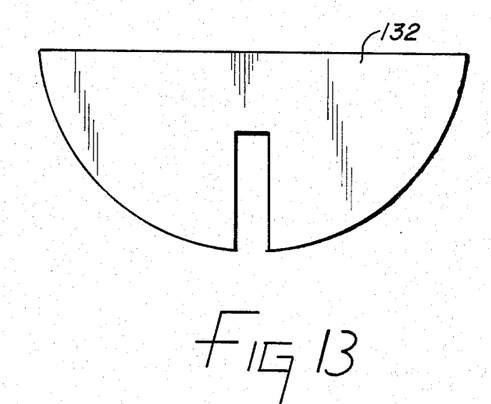
FIG. 13 is a plan view of the void former of FIGS. 11 and 12.

A second embodiment of the void former is shown in FIGS. 11 to 13. In these figures, a unitary void former 132 is used in combination with a diagonally disposed connecting and securing means 138, co-acting with the mold wall 136, in order to secure the unitary void former 132 to the mold wall during the setting of the concrete. Also, it is noted that the tip of this diagonally disposed screw 138 secures the anchor element in the void former 132.

In either embodiment, the result, after the concrete has been set, is that of a semi-hemispherical void within the surface of the concrete body, into which projects the tongue and aperture elements of the anchor 20. After formation of said hemispherical recess 34 with the projecting aperture 30 and tongue 28 of the anchor element, the concrete body is ready to be lifted with a novel scissors lifting means, following removal of the void forming element. Such removal of the void forming element can typically be accomplished with the use of a screwdriver or like prying means or by transmitting pressure from the void former to the head of the anchor by tightening a screwbolt that has been inserted at a parallel attitude to the end of the anchor.

There is illustrated in FIGS. 14 to 18 the scissors-like engagement means 50, this engagement means comprising a first mating element 52 (see FIG. 18) and a second mating element 54 (see FIG. 17), and second mating element 54 being complementary in all respects to said first mating element 52.

Figure 14:
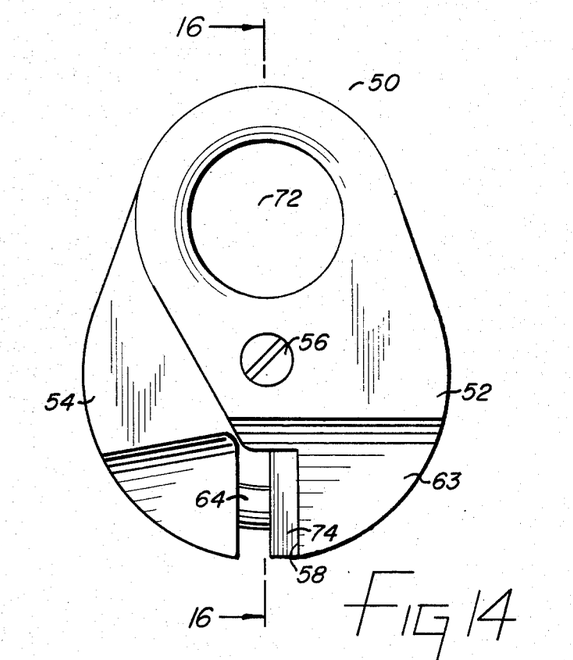
FIG. 14 is a front perspective view of a scissors-like engagement means, together with its spacer plate element.
Figure 16:
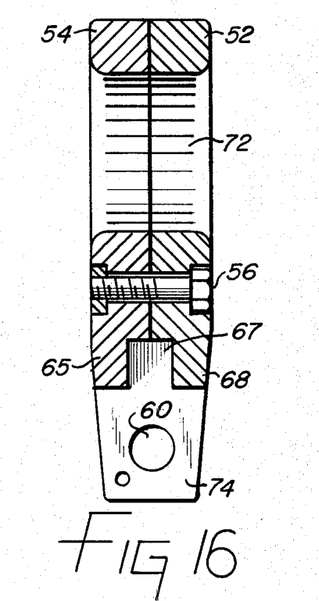
FIG. 16 is a side cross-sectional view of said scissors means.
Figure 17:
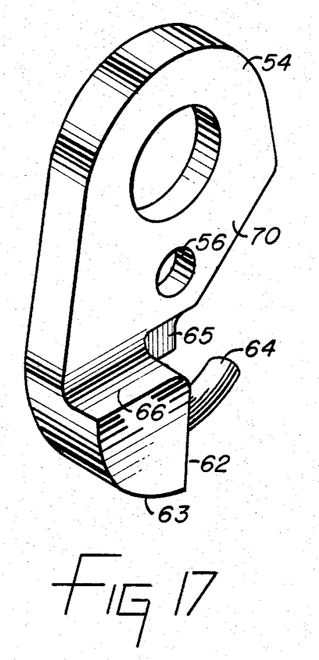
FIG. 17 is a perspective view of a first mating element of the scissors means.
Figure 18:
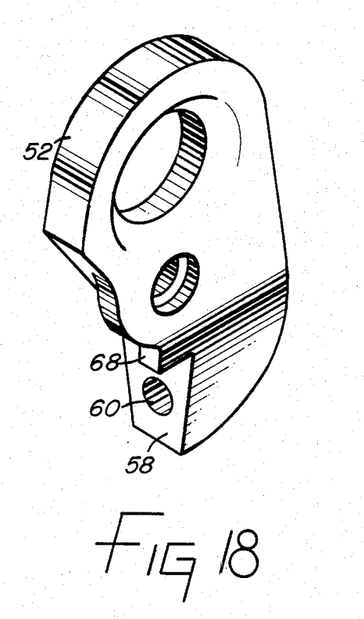
FIG. 18 is a perspective view of a second mating element of the engagements means.

The respective mating elements 52 and 54 are joined at a common pivot point 56 by nut and bolt securement means. The "mouth" of the scissors-like engagement means 50 is defined by a first surface 58 and a second surface 62. Within surface 58 is a female recess 60 which is complementary in its solid dimensions to a male element 63 which extends from said surface 62 of the second mating element 54. Said surfaces 58 and 62 also define a rectangular recess 67. In FIGS. 14 and 16, it may be appreciated that the configuration of the "mouth" of the second mating element 54 is adapted to facilitate the precise engagement of the protruding segment of the anchor element 20 which, more particularly, consists of the circular opening 30 and rectangular tongue 28. Further, it is to be noted that the lower exterior of the engagement means defines a parabolic cross-section (see FIG. 14) which closely conforms to the semi-hemispherical void 34 that is formed in the concrete body through the function of void formers 32 and 132 (above described). Thereby, the conformance of the gripping elements 58, 60, 62 and 64 to the elements 28 and 30 of the anchor means in combination with the conformance of the shape of the exterior surface of the engagement means with the semi-hemispherical void 34 within the concrete body, will result in a very firm and secure engagement of the anchor element (and thereby the concrete body itself) by the engagement means. Additionally, the problem of spalling of the surface of the concrete body by the lifting means is effectively eliminated by virtue of the unique complementary relationship between the mount of the engagement means and the protruding segment, i.e., the anchor 20 and tongue element 28. (Shoulder portions 65 and 68 in FIG. 16 engage the tongue element and thereby prevent lateral movement of the engagement means 50.) Further, the surfaces 58 and 62 prevent rotational torque of the scissors means relative to the anchor.

The engagement means is also provided with a gripping area 72, the exact configuration of which may be varied in accord with the lifting mechanism with which the engagement means is to be used. Once the lifting mechanism is in place, it will serve to prevent the mating elements from opening and thereby will lock the engagement means onto the anchor.

Figure 15:
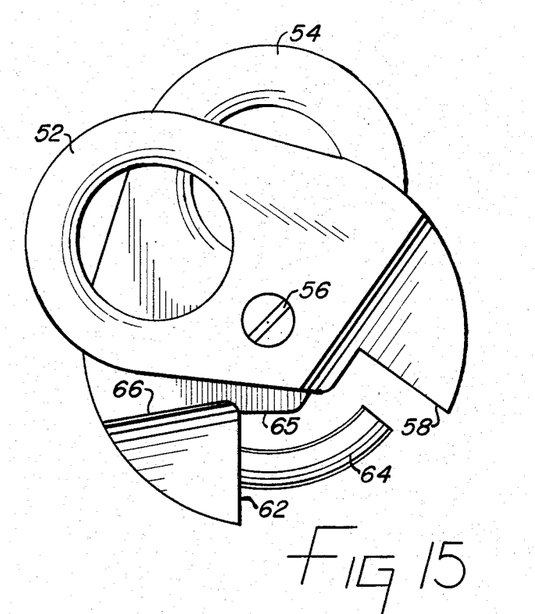
FIG. 15 is an operational view of the scissors means showing an angular offset between the mating elements thereof as the engagement means is being used.

With further respect to the figures, FIG. 14 shows the engagement means in a closed position. FIG. 16 is a side sectional view of FIG. 14. FIG. 15 shows the respective elements 52 and 54 of the engagement means in an open position, displaced from each other sufficiently to permit the entrance of the anchor elements. Also shown in FIGS. 14 and 16 is spacer plate 74 which is used with certain width anchors in order to limit the possibility of rotation or torque between the anchor element and the engagement means.

It is to be appreciated that each of the elements defined herein, namely, the anchor element 20 or 120, the void former 32 or 132, and the scissors-like engagement means 50, represent integral elements of a hoisting shackle system whereby it is feasible to precisely position the anchor element within the body of the building component and, as the segment of the anchor element projecting from the body of the building element, to accurately position such extended segment of the anchor element within a specially formed semi-hemispherical void, this void being formed by the use of the void formers above described. The use of the void formers additionally acts to create a recess within the surface of the building component which will permit the nesting of the lower exterior of the scissors-like engagement means within said semi-hemispherical void in order to reduce any potential for damage to the building component by the engagement means and, similarly, to protect adjacently disposed building components from possible damage from protruding anchor elements. Additionally, the configuration and spacing of the mating surfaces 58 and 62 of the engagement means will co-act with the exposed elements 28 and 30 of the anchor to precisely and securely engage both the anchor and the entire building component, this permitting re-positioning of the building component in a spall-free manner.

Figure 19:
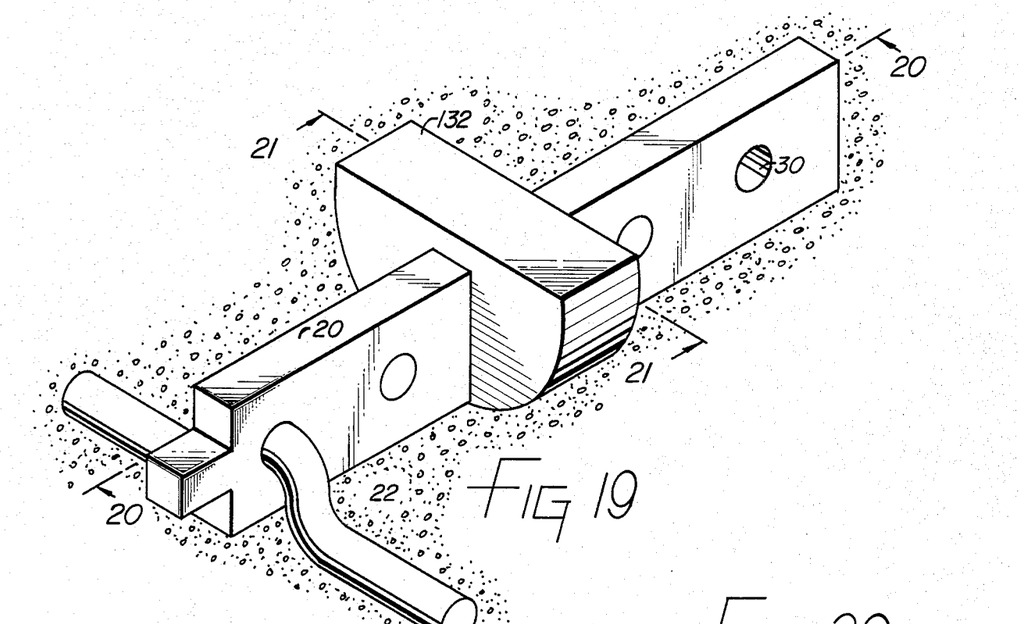
FIG. 19 is a perspective view of an alternative method of engagement of the anchor means, showing the void former.
Figure 20:
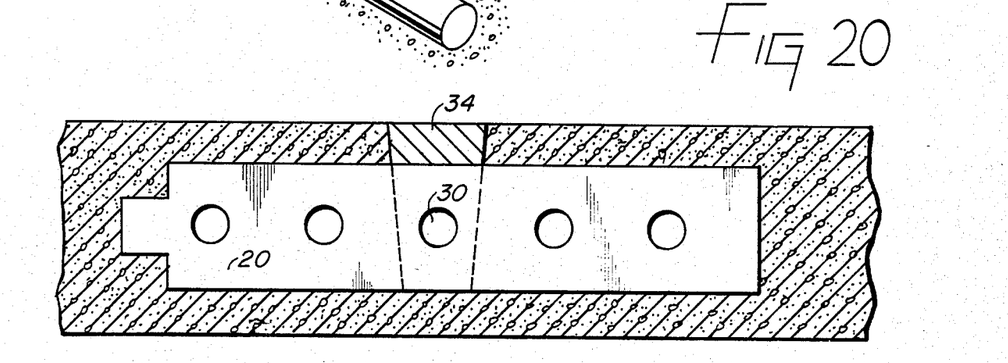
FIG. 20 is a longitudinal sectional view of the anchor and void former in the method of FIG. 19, taken along line 20—20 of FIG. 19.

Shown in FIG. 19 is a perspective view of an alternative method of engagement of the anchor means. In this method, the entire anchor 20 is embedded within the concrete slab; however, a semi-hemispherical void (see the sectional view of FIG. 20) will permit access to one circular aperture 30 of the anchor 20.

Figure 21:
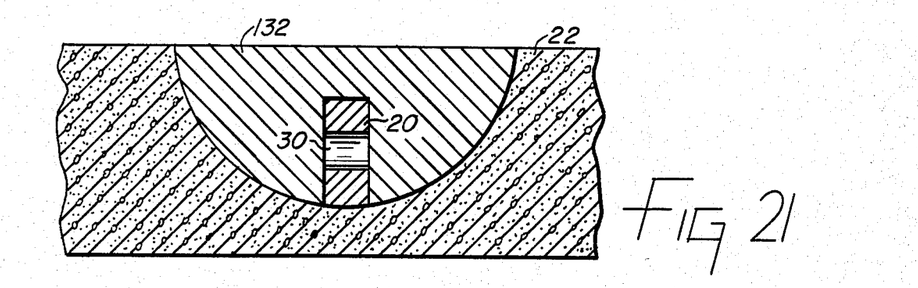
FIG. 21 is a transverse sectional view of the anchor and void former taken along line 21—21 of FIG. 19.

A cross section, taken along the center of the exposed aperture 30 is shown in FIG. 21.

Figure 22:
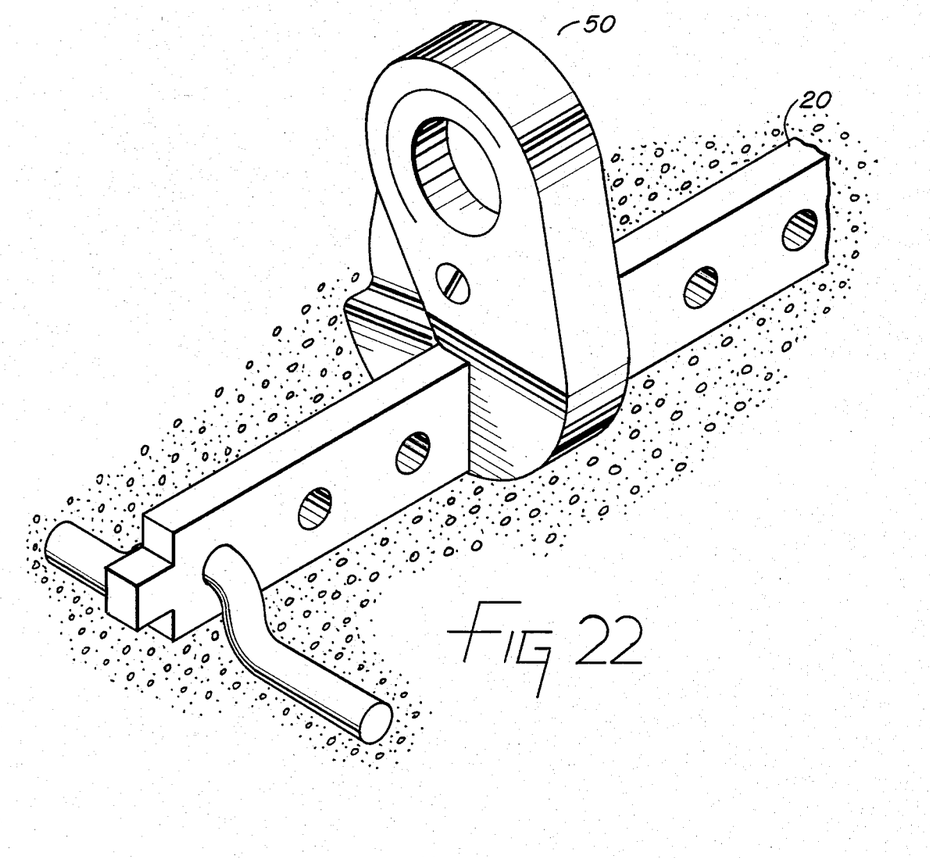
FIG. 22 is a perspective view, similar to FIG. 19, however, showing the engagement means.

After the recess including the aperture 30 has been formed, the above described scissors-like engagement means can be used in the identical manner above described in order to accomplish the engagement of the anchor element through the aperture 30. See FIG. 22. It is also to be appreciated that, in a given construction situation, it may be necessary to utilize both techniques of anchor engagement in order to achieve the desired stability in the lifting and moving process.

While there have been shown and described the preferred embodiments of the present invention, it will be understood that the invention may be embodied otherwise than as herein specifically illustrated or described and that within such embodiments certain changes in the detail or construction, or in the form and arrangement of the parts, may be made without departing from the underlying idea or principles of this invention within the scope of the appended claims.

Having thus described my invention what I claim as new, useful and non-obvious and, accordingly, secure by Letters Patent of the United States is:

1. A scissors-like engagement means, comprising: pivotally secured first and second mating elements mutually comprising, at the ends thereof, surfaces for complementally gripping and holding a projecting segment of an anchor means, and in which the external surfaces of the ends of said mating elements define a parabolic surface that nests within a semi-hemispherical recess surrounding said anchor means, said complemental gripping surfaces comprising male and female elements depending from and centrally disposed within the gripping surfaces, said gripping surfaces being normally parallel to each other when the engagement means is in a closed position about the anchor means, said male element comprising an elongate, curvilinear, solid cylindrical member, the line of curvature of which lies substantially equidistant from the surface of said semi-hemispherical recess within which said parabolic surface of said mating elements nests, whereby a positive interlock between said curvilinear male element and its complementary female element is thereby obtained, this, in combination with said anchor means gripping surfaces, precluding movement of said anchor means, relative to the engagement means, both within the linear axis of said male and female elements and in any plane transverse thereto.

2. The engagement means as recited in claim 1, further comprises an opening, in the nature of a lifting eye, for engagement by a shackle, said lifting eye disposed within each of said mating elements and above the pivot point therebetween.

3. The engagement means as recited in claim 2 in which said mating elements are pivotally joined at a point below the origin of the radius of the point, of the parabolic line of the external surfaces of the ends of said mating elements, at which the anchor means gripping surfaces thereof are closest.

4. The engagement means as recited in claim 1, further comprises a spacer plate for selective insertion onto the said gripping surfaces in order to provide a firm conformal engagement of the projecting segment of the anchor means and to further reduce undesired rotational torque.

5. The engagement means as recited in claim 1 in which said mating elements are pivotally joined at a point below the origin of the radius of the point, of the parabolic line of the external surfaces of the ends of said mating elements, at which the anchor means gripping surfaces thereof are closest.

* * * * *